(12) United States Patent
Yasui et al.

(10) Patent No.: US 9,928,351 B2
(45) Date of Patent: Mar. 27, 2018

(54) MAINTENANCE SERVER, MAINTENANCE METHOD, NON-TRANSITORY COMPUTER-READABLE STORAGE MEDIUM IN WHICH MAINTENANCE PROGRAM IS STORED, AND MANAGEMENT SERVER

(71) Applicant: KYOCERA Document Solutions Inc., Osaka (JP)

(72) Inventors: Toru Yasui, Osaka (JP); Takeshi Araya, Osaka (JP); Takumi Nakamura, Osaka (JP); Koki Nakajima, Osaka (JP); Hiromasa Akamatsu, Osaka (JP)

(73) Assignee: Kyocera Document Solutions Inc. (JP)

( * ) Notice: Subject to any disclaimer, the term of this patent is extended or adjusted under 35 U.S.C. 154(b) by 91 days.

(21) Appl. No.: 14/938,784

(22) Filed: Nov. 11, 2015

(65) Prior Publication Data

US 2016/0147980 A1 May 26, 2016

(30) Foreign Application Priority Data

Nov. 21, 2014 (JP) ................................ 2014-236237

(51) Int. Cl.
*G06F 21/00* (2013.01)
*G06F 21/10* (2013.01)

(52) U.S. Cl.
CPC .... *G06F 21/105* (2013.01); *G06F 2221/2137* (2013.01)

(58) Field of Classification Search
CPC ................. G06F 21/121; G06F 21/608; G06F 2221/2137; G06F 3/1222; G06F 3/1224; G06F 3/1238; G06F 3/1285; G06F 3/1288; G06F 3/1296
See application file for complete search history.

(56) References Cited

U.S. PATENT DOCUMENTS

2010/0058482 A1\* 3/2010 Nagumo ............ H04N 1/00912
726/26
2012/0215662 A1\* 8/2012 Ito ........................... G06F 21/10
705/26.61

FOREIGN PATENT DOCUMENTS

| JP | 2002-269460 | 9/2002 |
|----|-------------|--------|
| JP | 2004-272387 | 9/2004 |
| JP | 2009-177383 | 8/2009 |

\* cited by examiner

*Primary Examiner* — Ghazal Shehni (57) ABSTRACT

A license management server manages a license to perform a service of remote maintenance related to one or more image forming apparatuses installed in a customer's site. The maintenance server includes a maintenance unit and a history management unit. If the license management server notified of expiration of an expiration date of the license defined by a contract, the maintenance unit stores history information acquired from the one or more image forming apparatuses corresponding to the expired license into a storage unit, and stops the service. If the license management server notified of grant of the license by a re-contract, the history management unit obtains the history information about the one or more image forming apparatuses corresponding to the granted license from the storage unit, and passes the obtained history information to the maintenance unit. By using the passed history information, the maintenance unit resumes the service.

4 Claims, 11 Drawing Sheets

MAINTENANCE SERVER, MAINTENANCE METHOD, NON-TRANSITORY COMPUTER-READABLE STORAGE MEDIUM IN WHICH MAINTENANCE PROGRAM IS STORED, AND MANAGEMENT SERVER

CROSS-REFERENCE TO RELATED APPLICATIONS

This application relates to and claims priority rights from Japanese Patent Application No. 2014-236237, filed on Nov. 21, 2014, the entire disclosures of which are hereby incorporated by reference herein.

BACKGROUND

1. Field of the Present Disclosure

The present disclosure relates to a maintenance server, a maintenance method, a non-transitory computer-readable storage medium in which the maintenance program is stored, and a management server.

2. Description of the Related Art

Manufacturers of copying machines, multifunction peripherals (MFPs), printers, and the like (hereinafter, referred to collectively as image forming apparatuses) have made various contrivances to centralizedly manage image forming apparatuses installed in customers' sites and do remote maintenance.

For example, in a typical system, the customers' image forming apparatuses are not managed by respective service shops. Instead, a center is provided to manage the image forming apparatuses in an integrated manner. The center provides information for managing maintenance and inspection schedules, including the usages of the image forming apparatuses and peripheral equipment, to the service shops. This can reduce man-hours of the service shops for managing the customers' equipment.

In another typical system, a server obtains customer information about customers with which sales shops have traded in products, as well as product information. The server extracts other customers having the same attributes as those of the traded customers, and provides the product information about the traded products for sales shops in charge of the extracted customers.

The remote maintenance system is mostly used by sales companies and sales shops which sell image forming apparatuses. Since fees are charged for use, a trial contract is sometimes concluded for a trial operation before an actual contract to use the system. After the effectiveness of the system is confirmed, the actual contract is concluded to start official operations.

If a sales company or the like performs a trial operation before official operations, the sales company or the like becomes unable to use the system at the end of the trial operation. History information about image forming apparatuses acquired during the trial period is discarded. This means a problem that the sales company or the like that conducts official operations after the trial operation cannot use the history information of the trial operation for the official operations.

SUMMARY

A maintenance server according to an aspect of the present disclosure includes: a storage unit; a maintenance unit configured to, if notified by a license management server of expiration of an expiration date of a license defined by a contract, the license management server being configured to manage the license to perform a service of remote maintenance related to one or more image forming apparatuses installed in a customer's site, store information acquired from the one or more image forming apparatuses corresponding to the license of which the expiration date has expired into the storage unit as history information, and then stop the service related to the one or more image forming apparatuses corresponding to the license of which the expiration date has expired; and a history management unit configured to, if notified by the license management server of grant of the license by a re-contract, obtain the history information about the one or more image forming apparatuses corresponding to the granted license from the storage unit, and pass the obtained history information to the maintenance unit. After the history information is passed from the history management unit, the maintenance unit resumes providing the service related to the one or more image forming apparatuses corresponding to the license granted by the re-contract by using the history information.

A maintenance method according to an aspect of the present disclosure includes: storing, if notified by a license management server of expiration of an expiration date of a license defined by a contract, the license management server being configured to manage the license to perform a service of remote maintenance related to one or more image forming apparatuses installed in a customer's site, information acquired from the one or more image forming apparatuses corresponding to the license of which the expiration date has expired into a storage unit as history information, and then stopping the service related to the one or more image forming apparatuses corresponding to the license of which the expiration date has expired; and obtaining, if notified by the license management server of grant of the license by a re-contract, the history information about the one or more image forming apparatuses corresponding to the granted license from the storage unit, and resuming providing the service related to the one or more image forming apparatuses corresponding to the license granted by the re-contract by using the obtained history information.

A non-transitory computer-readable storage medium according to an aspect of the present disclosure has a maintenance program stored therein. The maintenance program causes a computer to execute the procedures of: storing, if notified by a license management server of expiration of an expiration date of a license defined by a contract, the license management server being configured to manage the license to perform a service of remote maintenance related to one or more image forming apparatuses installed in a customer's site, information acquired from the one or more image forming apparatuses corresponding to the license of which the expiration date has expired into a storage unit as history information, and then stopping the service related to the one or more image forming apparatuses corresponding to the license of which the expiration date has expired; and obtaining, if notified by the license management server of grant of the license by a re-contract, the history information about the one or more image forming apparatuses corresponding to the granted license from the storage unit, and resuming providing the service related to the one or more image forming apparatuses corresponding to the license granted by the re-contract by using the obtained history information.

A management server according to an aspect of the present disclosure includes: a storage unit; a license management unit configured to manage a license defined by a contract to perform a service of remote maintenance and the like related to one or more image forming apparatuses installed in a customer's site; a maintenance unit configured to provide the service related to the one or more image forming apparatuses, and if notified by the license management unit of expiration of an expiration date of the license, store information acquired from the one or more image forming apparatuses corresponding to the license of which the expiration date has expired into the storage unit as history information, and then stop the service related to the one or more image forming apparatuses corresponding to the license of which the expiration date has expired; and a history management unit configured to, if notified by the license management unit of grant of the license by a re-contract, obtain the history information about the one or more image forming apparatuses corresponding to the granted license from the storage unit, and pass the obtained history information to the maintenance unit. After the history information is passed from the history management unit, the maintenance unit resumes providing the service related to the one or more image forming apparatuses corresponding to the license granted by the re-contract by using the history information.

These and other objects, features and advantages of the present disclosure will become more apparent upon reading of the following detailed description along with the accompanied drawings.

DETAILED DESCRIPTION

Hereinafter, an embodiment of the present disclosure will be described with reference to the drawings. In the following description, an overview of the embodiment will initially be provided. The embodiment will then be described in detail by using a specific example.

[Overview]

Figure 1:
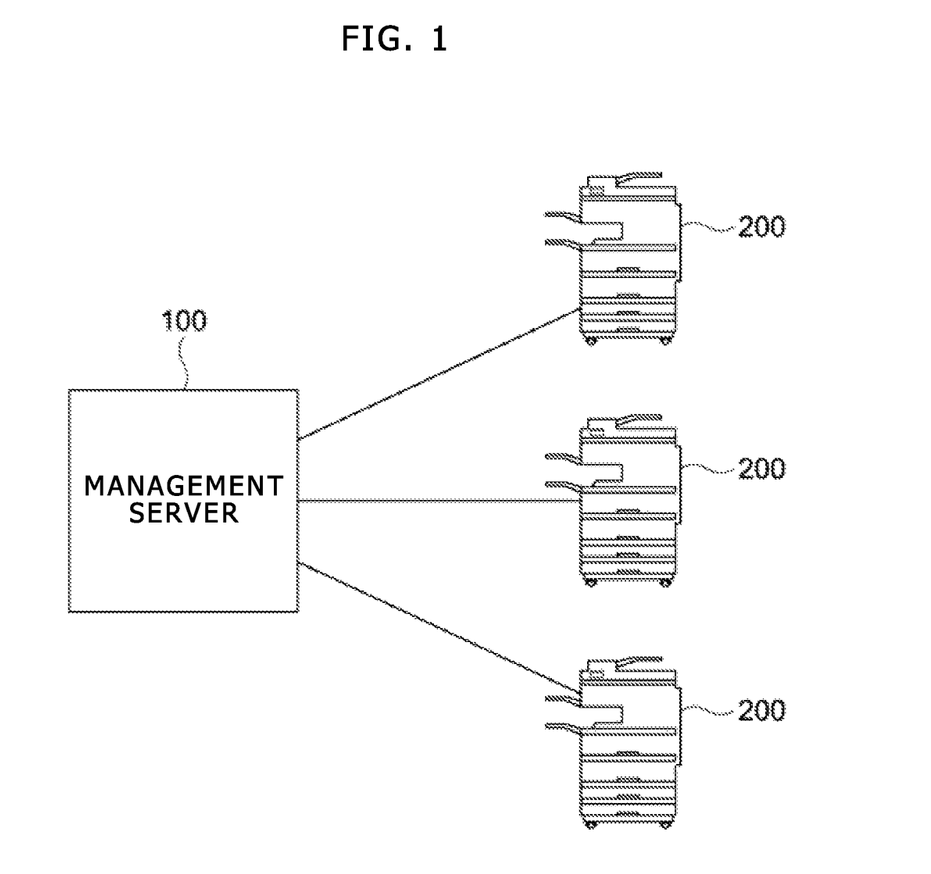
FIG. 1 is a diagram showing an outline of a system including a management server according to an embodiment of the present disclosure.

FIG. 1 is a diagram showing an outline of a system including a management server according to the embodiment of the present disclosure.

Image forming apparatuses 200 of which to do remote maintenance are installed in customer's site. The image forming apparatuses 200 are subjected to remote maintenance by a management server 100.

Figure 2:
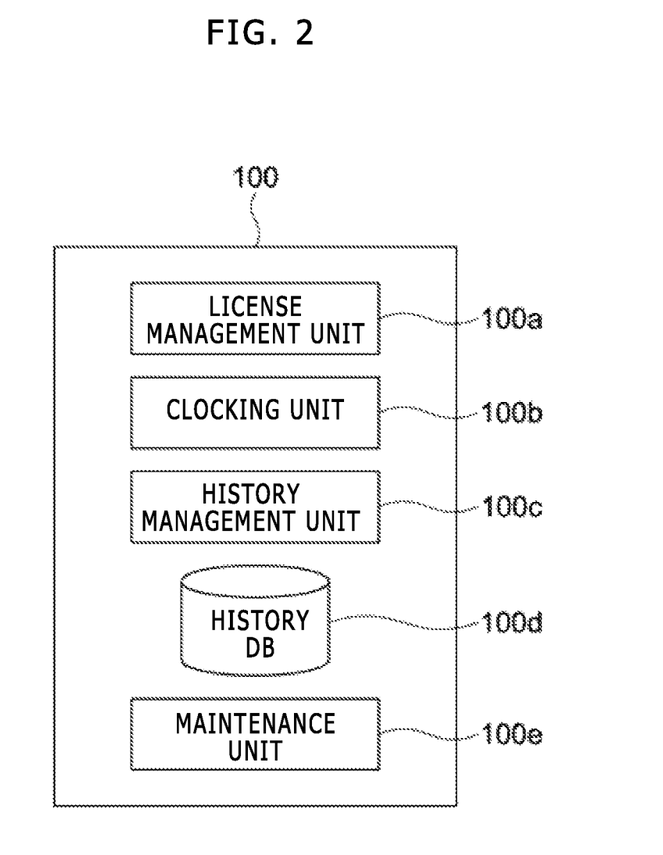
FIG. 2 is a block diagram of a management server 100 shown in FIG. 1.

FIG. 2 is a block diagram of the management server 100 shown in FIG. 1.

The management server 100 includes a license management unit 100a, a clocking unit 100b, a history management unit 100c, a history database (DB) 100d, and a maintenance unit 100e.

The license management unit 100a manages licenses for providing services such as remote maintenance for the image forming apparatuses 200.

The clocking unit 100b clocks to see whether a preset time has elapsed.

The history management unit 100c stores history information obtained from the image forming apparatuses 200 into the history DB 100d, and obtains stored history information from the history DB 100d.

The history DB 100d stores information about the image forming apparatuses 200 serving as the objects of remote maintenance and the like as a history.

The maintenance unit 100e performs remote maintenance and the like on the image forming apparatuses 200.

Figure 3:
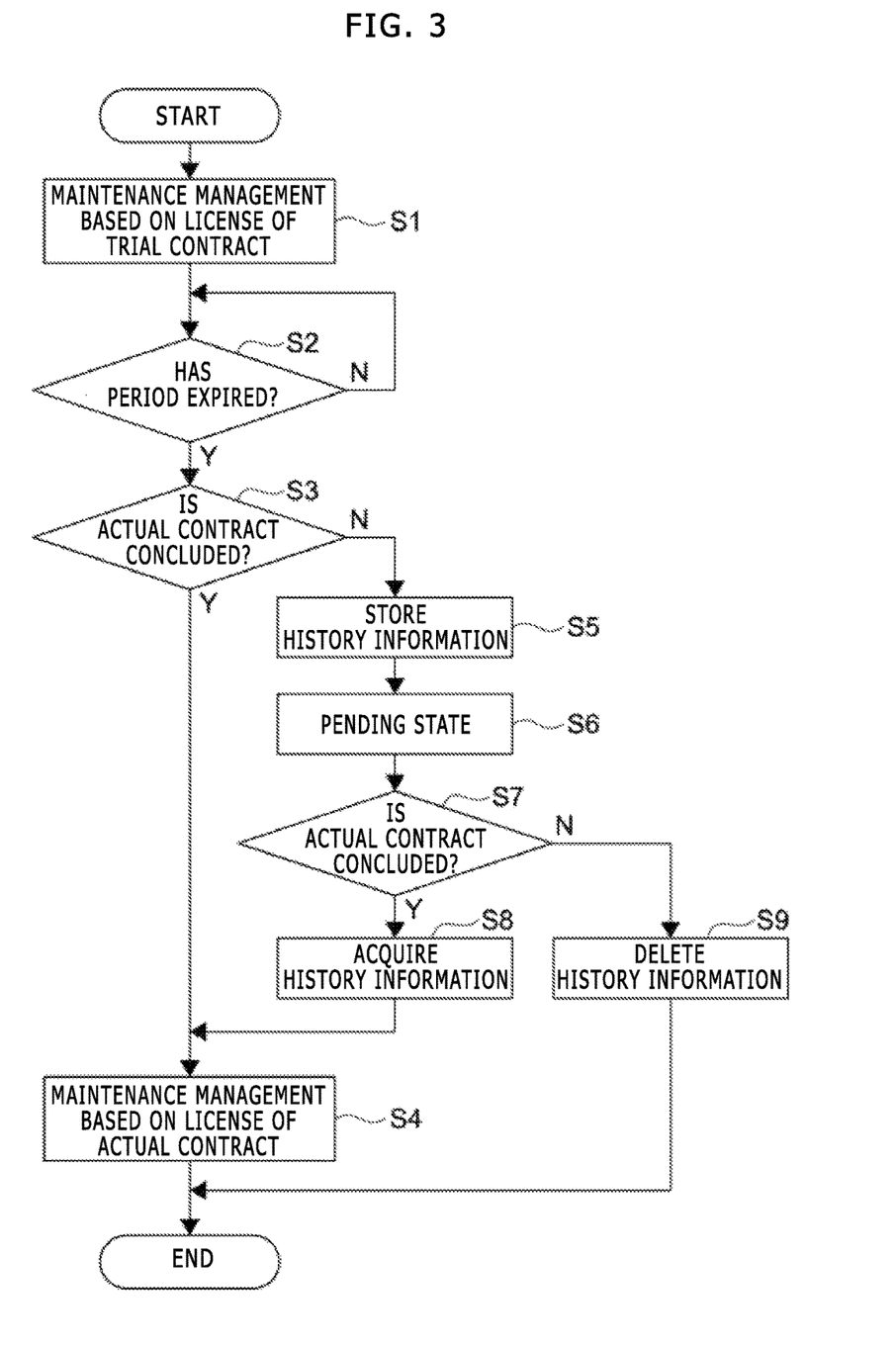
FIG. 3 is a flowchart of processing by the management server 100 shown in FIG. 1.

FIG. 3 is a flowchart for describing a flow of processing by the management server 100 shown in FIG. 1.

Initially, the license management unit 100a sets a license based on a trial contract, and notifies the maintenance unit 100e of the setting. The maintenance unit 100e performs remote maintenance and the like of the image forming apparatuses 200 on the basis of the set license of the trial contract (step S1).

Next, the license management unit 100a determines whether the period of the trial contract has expired, on the basis of measurement of elapsed time by the clocking unit 100b (step S2).

If the period of the trial contract has expired (Y in step S2), the license management unit 100a then determines whether an actual contract is concluded and a license of the actual contract is granted (step S3).

If the license of the actual contract is granted (Y in step S3), the license management unit 100a notifies the maintenance unit 100e of the grant of the license. The maintenance unit 100e performs remote maintenance and the like of the image forming apparatuses 200 according to the license of the actual contract (step S4).

If the actual contract is not concluded (N in step S3), the license management unit 100a notifies the maintenance unit 100e and the history management unit 100c of the expiration of the expiration date of the license. The history management unit 100c stores the information obtained so far about the image forming apparatuses 200 into the history DB 100d as history information (step S5).

Next, the maintenance unit 100e stops the maintenance of the image forming apparatuses 200 of which the license has expired, and brings the image forming apparatuses 200 into a pending state (step S6). While in the pending state, information acquisition from the image forming apparatuses 200 is not performed.

Next, the license management unit 100a determines whether an actual contract (re-contract) for the image forming apparatuses 200 of which the license has expired is concluded and a license based on the actual contract is granted, at regular time intervals measured by using the clocking unit 100b (step S7).

If the actual contract is concluded (Y in step S7), the license management unit 100a notifies the maintenance unit 100e and the history management unit 100c that the license is granted again. The history management unit 100c obtains the history information about the licensed image forming apparatuses 200 from the history DB 100d (step S8). The maintenance unit 100e performs remote maintenance and the like of the image forming apparatuses 200 based on the license of the actual contract (step S4).

If the actual contract is not concluded (N in step S7), the history management unit 100c deletes the history information about the image forming apparatuses 200 of which the actual contract is not concluded after a lapse of a certain period (step S9).

In the foregoing description, a transition from the trial contract to the actual contract has been described, distinguishing the trial contract from the actual contract. However, such a configuration is not restrictive. Without a distinction between the trial contract and the actual contract, the actual contract may be once ended and concluded again after the pending state.

In the following concrete example, a configuration of simpler mechanism without a distinction between the trial contract and the actual contract will be described in detail.

Concrete Example

Next, details of a maintenance server according to an embodiment of the present disclosure will be described. Note that in the following description, the foregoing management server 100 is divided between a license management server 10 and a maintenance server 20.

Figure 4:
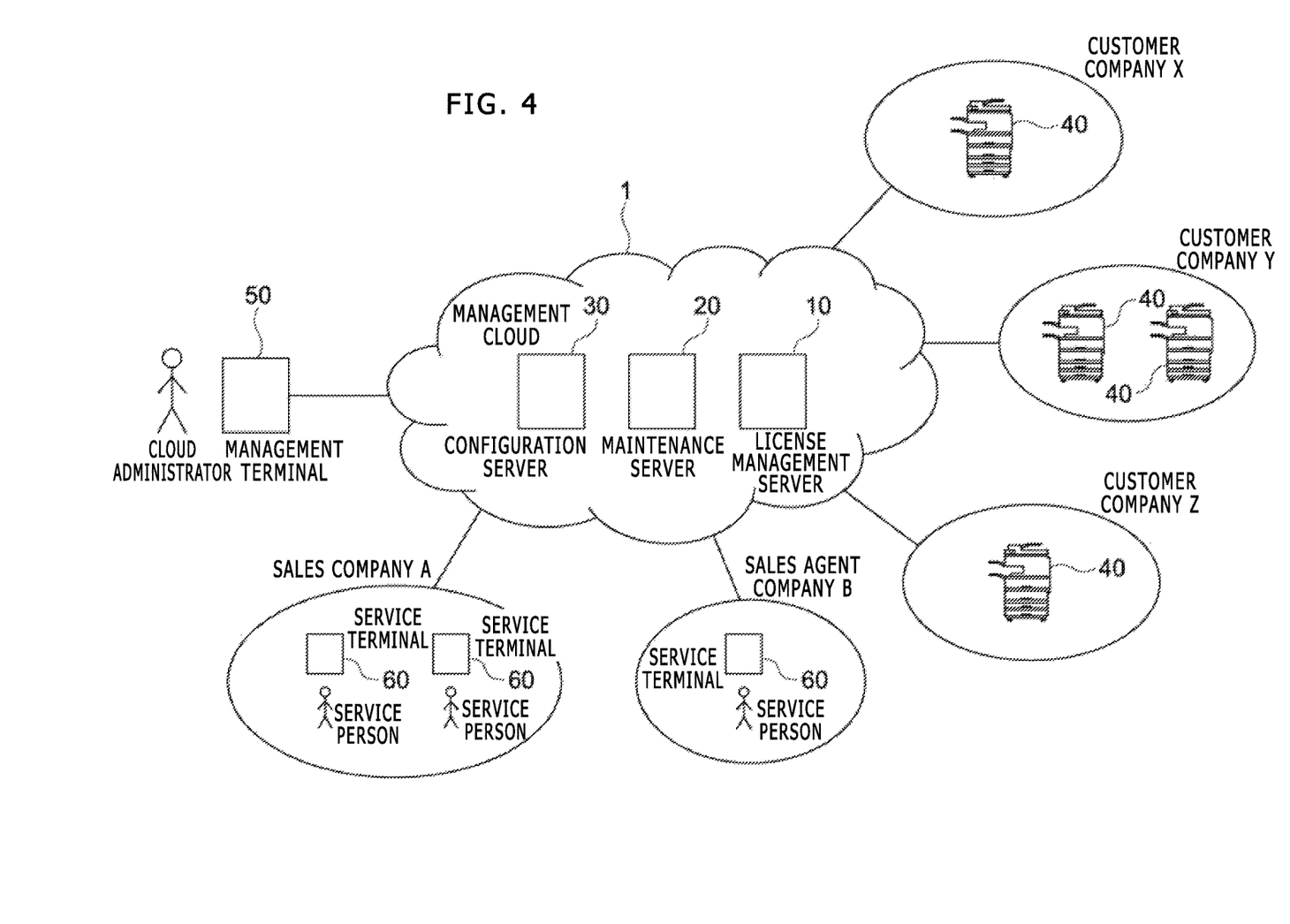
FIG. 4 is a diagram showing an example of an environment in which a maintenance server according to an embodiment of the present disclosure runs.

Initially, an example of an environment in which the maintenance server according to the embodiment of the present disclosure runs will be described. FIG. 4 is a diagram for describing the example of the environment in which the maintenance server according to the embodiment of the present disclosure runs.

Image forming apparatuses 40 are installed in customer companies X, Y, and Z which use the image forming apparatuses 40. The image forming apparatuses 40 are remotely managed from a management cloud 1 via a network.

The management cloud 1 includes a configuration server 30, the maintenance server 20, and the license management server 10. The configuration server 30 manages a configuration of the image forming apparatuses 40 of the customers. The maintenance server 20 supports maintenance of the image forming apparatuses 40 of the customers. The license management server 10 manages licenses of maintenance and the like for the image forming apparatuses 40 of the customers.

A cloud administrator who manages the management cloud 1 accesses and manages the servers on the management cloud 1 from a management terminal 50.

Servicepersons (may include salespersons) of a sales company A and a sales agent company B serve as users of the management cloud 1 to perform maintenance and the like of the image forming apparatuses 40 of the customers. The servicepersons access the management cloud 1 via service terminals 60, and perform remote maintenance and the like of the image forming apparatuses 40 installed in the customers' sites by using the maintenance server 20.

An example of the environment in which the maintenance server 20 runs has been described above.

<Licenses and Groups>

Next, two examples (examples 1 and 2) of licenses granted by contracts and groups in units of which the licenses are granted will be described.

Example 1

Figure 5:
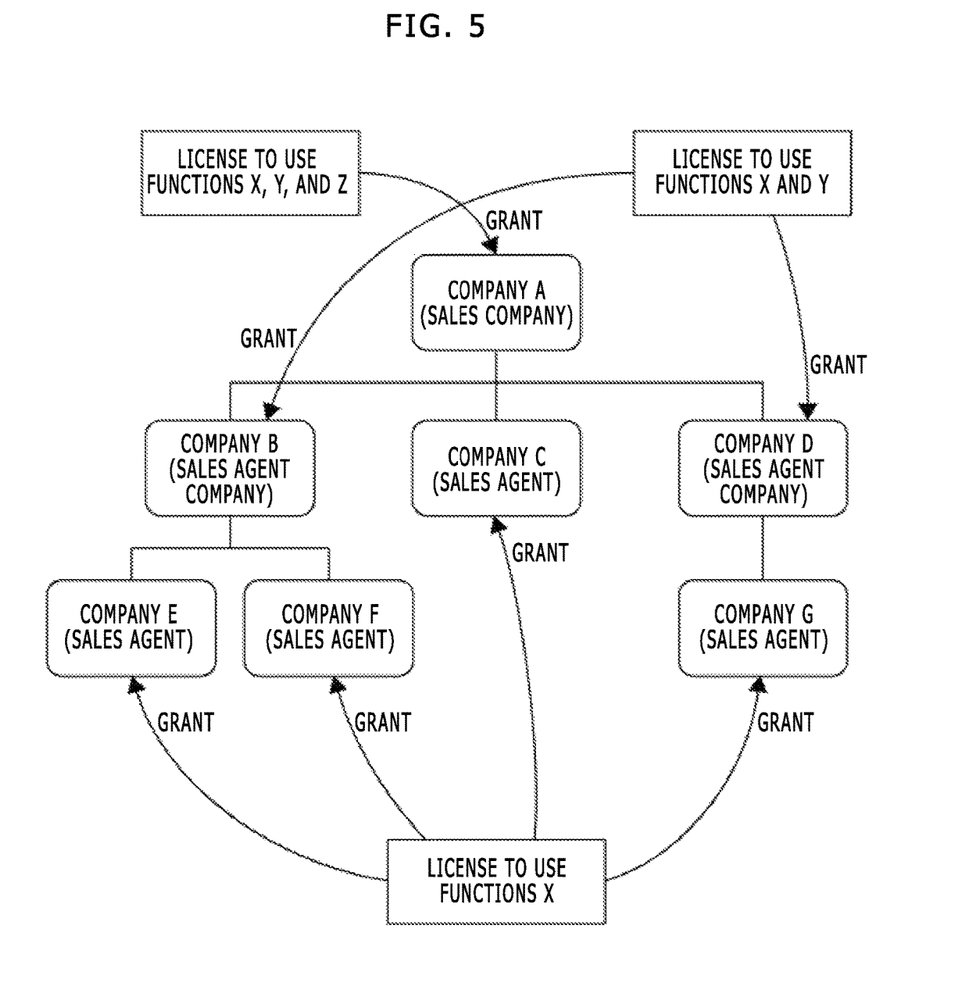
FIG. 5 is a diagram showing an example (example 1) of licensing by a license management server 10 shown in FIG. 4.

FIG. 5 is a diagram for describing an example (example 1) of licensing by the license management server 10 shown in FIG. 4.

The license management server 10 grants licenses on the basis of group types of groups, with independent business organizations to conclude a contract with as groups.

For example, a license to use functions X, Y, and Z of the management cloud 1 is granted to Company A which has a group type of "sales company."

A license to use the functions X and Y of the management cloud 1 is granted to Company B and Company D which have a group type of "sales agent company."

A license to use the function X of the management cloud 1 is granted to Company C, Company E, Company F, and Company G which have a group type of "sales agent."

Example 2

Figure 6:
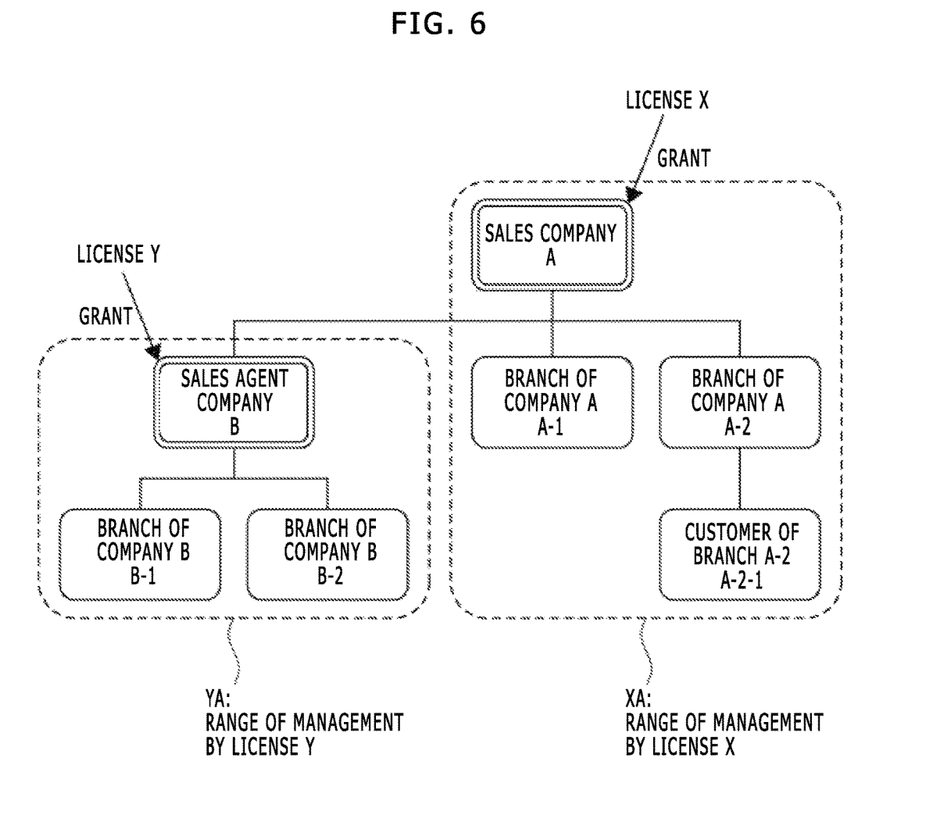
FIG. 6 is a diagram showing another example (example 2) of the licensing by the license management server 10 shown in FIG. 4.

FIG. 6 is a diagram for describing another example (example 2) of the licensing by the license management server 10 shown in FIG. 4.

In example 2, commission groups and normal groups are used to manage licenses. A commission group is an independent business organization to conclude a contract with. A normal group is one which is located under a commission group and to which an image forming apparatus or apparatuses 40 belong(s).

A license X is granted to a sales company A which is a commission group. The license X is applied to the normal groups included in a range XA of management by the license X.

A license Y is granted to a sales agent company B which is a commission group, on the basis of a contract with the sales company A. The license Y is applied to the normal groups included in a range YA of management by the license Y.

In FIGS. 5 and 6, the vertical hierarchy may represent an inclusion relationship of target areas.

In the following description, the foregoing organizations licensed in the examples 1 and 2 will be referred to as groups.

In such a manner, the license management server 10 grants groups licenses based on contracts. The expiration dates of the granted licenses are defined by the contracts.

Licenses granted by contracts and groups in units of which the licenses are granted have been described above.

<Configuration of License Management Server 10>

Figure 7:
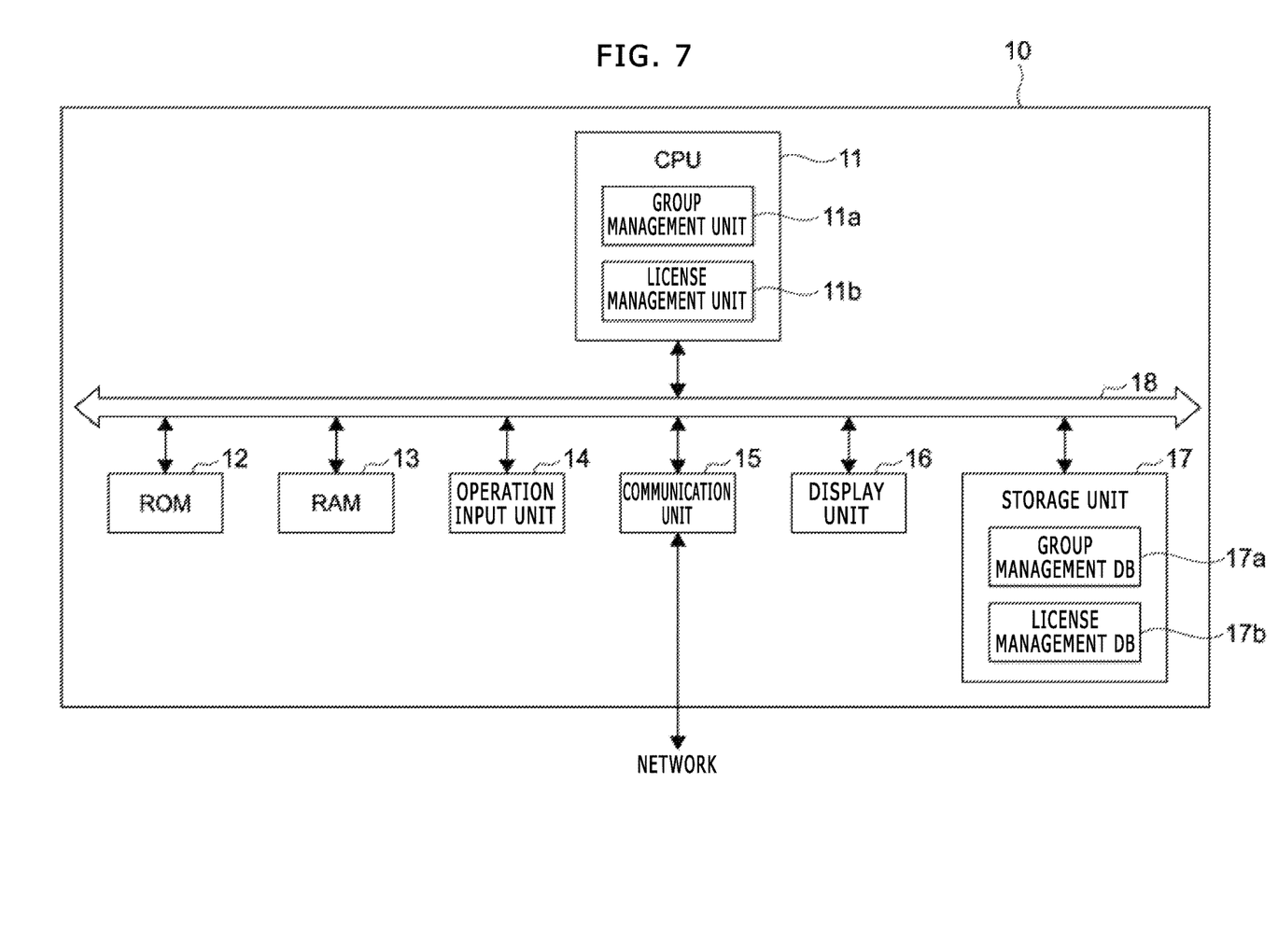
FIG. 7 is a block diagram showing a configuration example of the license management server 10 shown in FIG. 4.

Next, a configuration of the license management server 10 will be described. The license management server 10 may be implemented by dedicated hardware and/or software. The license management server 10 may be implemented by a general computer. FIG. 7 shows a block diagram of the license management server 10 that is implemented by a general computer.

As shown in FIG. 7, the license management server 10 includes a central processing unit (CPU) 11, a read only memory (ROM) 12, a random access memory (RAM) 13, an operation input unit 14, a communication unit 15, a display unit 16, and a storage unit 17. Such blocks are connected via a bus 18.

The ROM 12 stores a plurality of programs such as firmware for performing various types of processing, and data. The RAM 13 is used as a working area of the CPU 11. The RAM 13 temporarily stores an operating system (OS), various applications running, and various types of data under processing.

Examples of the storage unit 17 include a hard disk drive (HDD), a flash memory, and other nonvolatile memories. The storage unit 17 stores the OS, various applications, various types of data, a group management DB 17a for managing groups, and a license management DB 17b for managing licenses.

The group management DB 17a stores information and the like for managing groups.

The license management DB 17b stores information and the like for managing granted licenses.

The communication unit 15 is connected to a network for exchanging information with the maintenance server 20, the configuration server 30, the image forming apparatuses 40, the management terminal 50, and the service terminals 60.

The CPU 11 loads a program corresponding to a command given from the operation input unit 14 among the plurality of programs stored in the ROM 12 and the storage unit 17 into the RAM 13. According to the loaded program, the CPU 11 controls the display unit 16 and the storage unit 17 as appropriate.

Examples of the operation input unit 14 include a pointing device such as a mouse, a keyboard, a touch panel, and other operation devices.

Examples of the display unit 16 include a liquid crystal display, an electro-luminescence (EL) display, and a plasma display.

Next, functional blocks implemented by the CPU 11 executing a program or programs will be described.

The functional blocks implemented by the CPU 11 of the license management server 10 are a group management unit 11a and a license management unit 11b.

The group management unit 11a manages groups by using the group management DB 17a.

The license management unit 11b manages licenses by using the license management DB 17b.

The configuration of the license management server 10 has been described above.

<Configuration of Maintenance Server 20>

Figure 8:
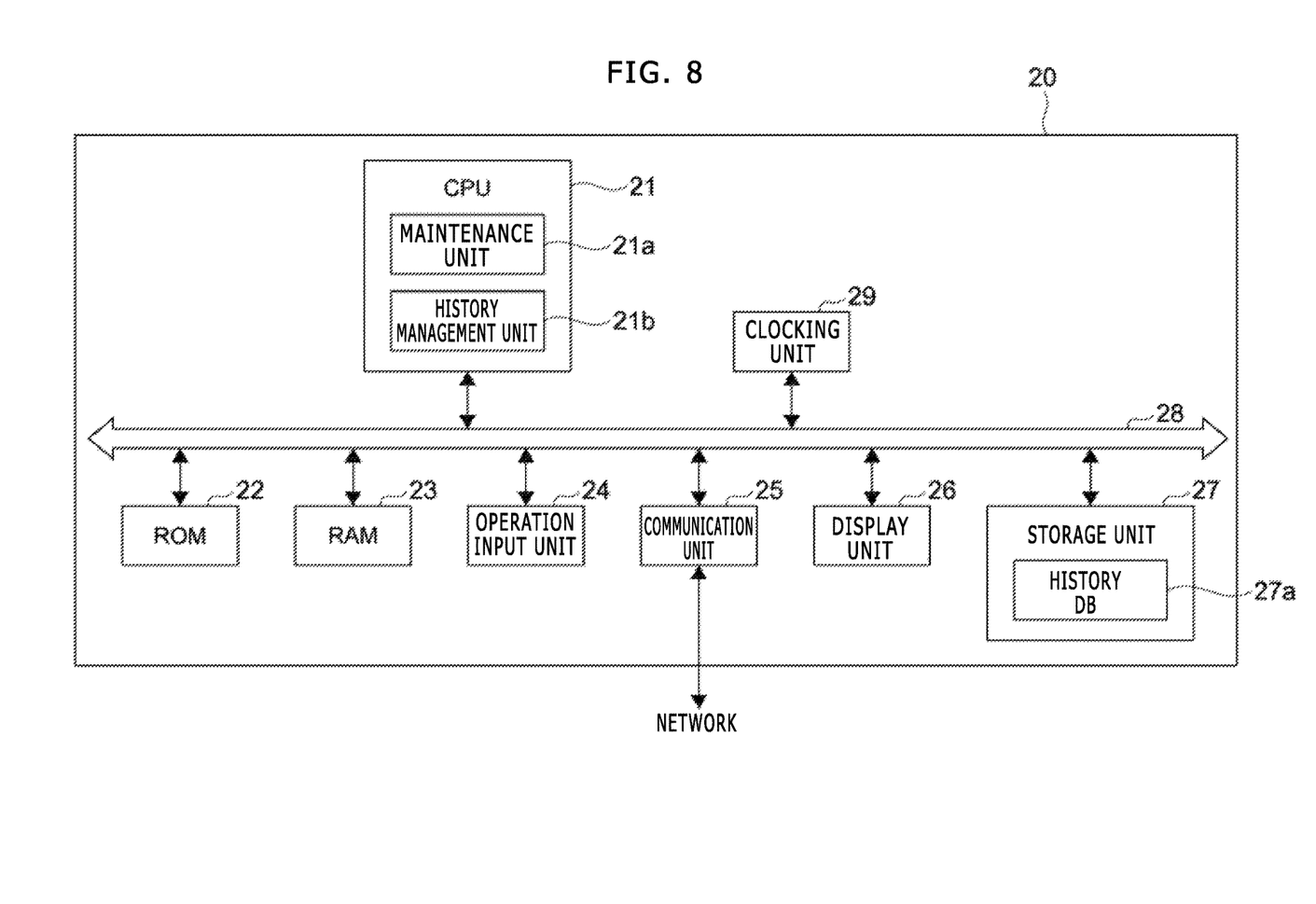
FIG. 8 is a block diagram of a management server 20 shown in FIG. 4.

Next, a configuration of the maintenance server 20 will be described. The maintenance server 20 may be implemented by dedicated hardware and/or software. The maintenance server 20 may be implemented by a general computer. FIG. 8 shows a block diagram of the maintenance server 20 that is implemented by a general computer.

As shown in FIG. 8, the maintenance server 20 includes a CPU 21, a ROM 22, a RAM 23, an operation input unit 24, a communication unit 25, a display unit 26, a storage unit 27, and a clocking unit 29. Such blocks are connected via a bus 28.

The ROM 22, the RAM 23, the operation input unit 24, the communication unit 25, and the display unit 26 have the same configuration as that of the ROM 12, the RAM 13, the operation input unit 14, the communication unit 15, and the display unit 16 described above. A description thereof will thus be omitted.

The storage unit 27 stores an OS, various applications, various types of data, and a history DB 27a for storing information acquired from the image forming apparatuses 40.

Functional blocks implemented by the CPU 21 of the maintenance server 20 are a maintenance unit 21a and a history management unit 21b.

The maintenance unit 21a performs services such as remote maintenance on the image forming apparatuses 40 installed in the customers' sites based on the granted licenses.

If the expiration date of a license for a group has expired, the history management unit 21b stores information acquired from the image forming apparatus or apparatuses 40 by the maintenance unit 21a into the history DB 27a as a history of the image forming apparatus(es) 40. If the group is licensed again, the history management unit 21b obtains the history of the image forming apparatus(es) 40 corresponding to the group from the history DB 27a, and passes the history to the maintenance unit 21a.

The configuration of the maintenance server 20 has been described above.

<Processing Flow 1 (When Contract Ends)>

Figure 9:
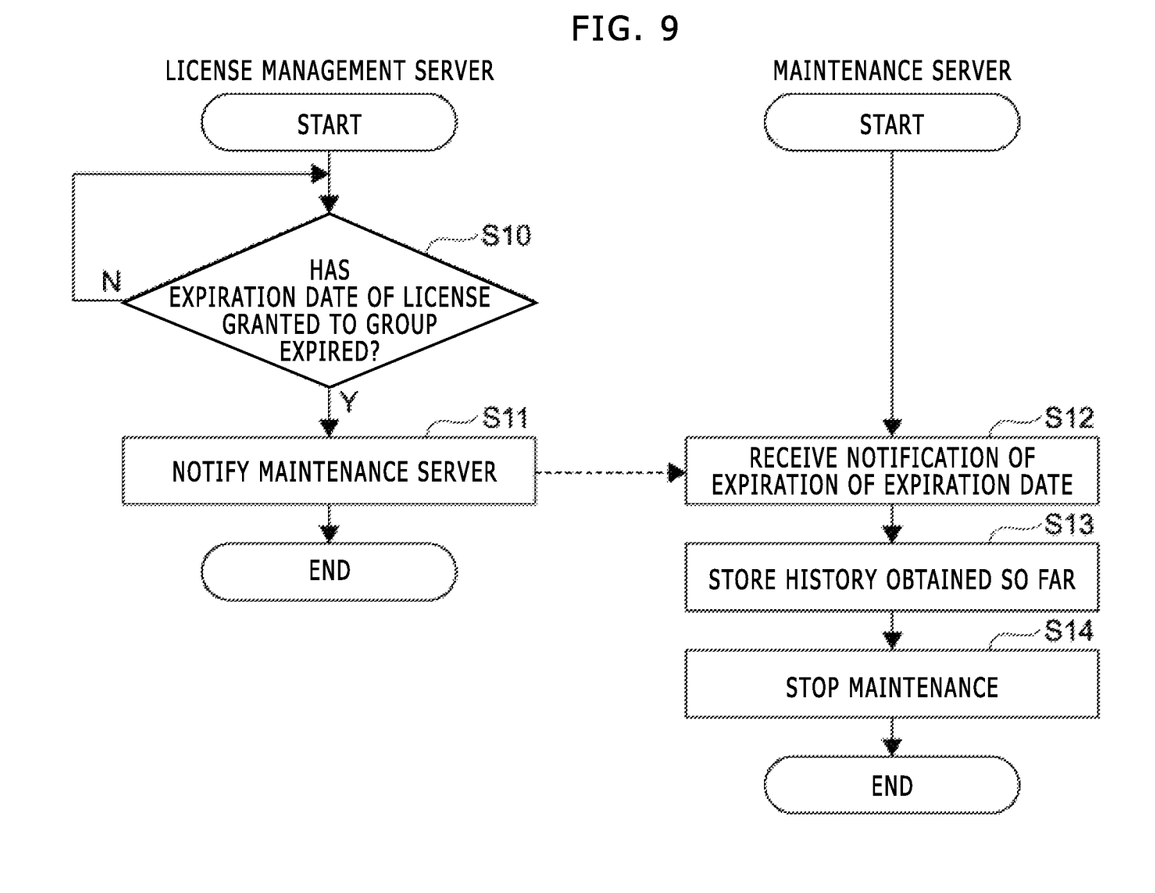
FIG. 9 is a flowchart showing processing when a trial contract or actual contract ends in the environment shown in FIG. 4.

Next, a flow of processing when a trial contract or actual contract ends (the expiration date of the license has expired) will be described. FIG. 9 is a flowchart for describing the processing when a trial contract or actual contract ends in the environment shown in FIG. 4.

Initially, the license management unit 11b of the license management server 10 determines whether the expiration date of a license granted to a specific group has expired (step S10).

If the expiration date has expired (Y in step S10), the license management unit 11b notifies the maintenance server 20 of the expiration of the license for the specific group (step S11).

Next, the maintenance unit 21a of the maintenance server 20 receives the notification of the expiration of the license for the specific group via the communication unit 25 (step S12).

Next, the maintenance unit 21a passes information about the image forming apparatus(es) 40 corresponding to the group of which the license has expired to the history management unit 21b. The history management unit 21b stores the passed information into the history DB 27a as a history of each of the image forming apparatus(es) 40 (step S13).

Next, the maintenance unit 21a stops maintenance, including the acquisition of the information from the image forming apparatus(es) 40 corresponding to the group of which the license has expired (step S14).

That is the flow of processing when a trial contract or actual contract ends.

<Processing Flow 2 (With Re-Contract)>

Figure 10:
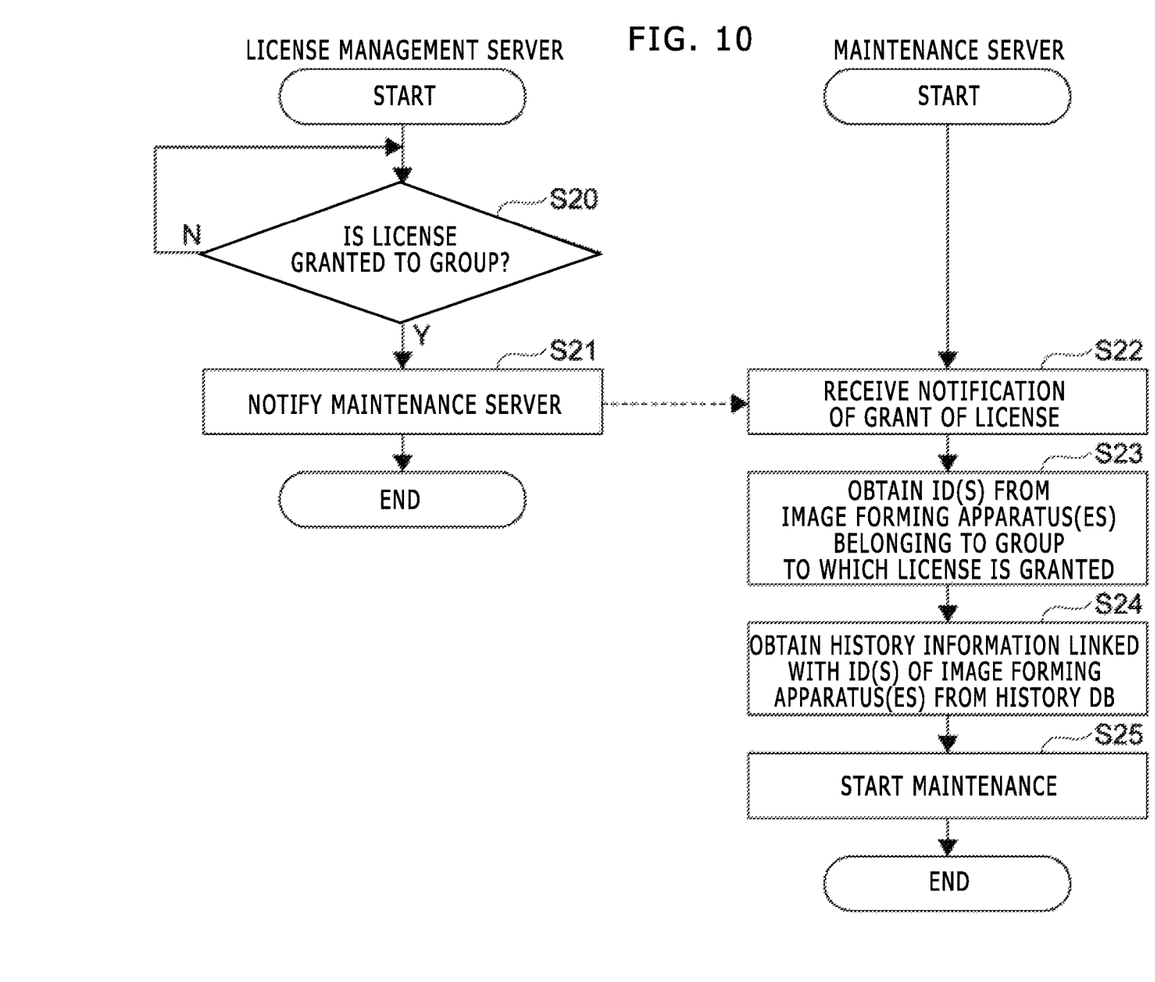
FIG. 10 is a flowchart showing processing when a contract is concluded again after an end of a contract in the environment shown in FIG. 4.

Next, a flow of processing when a contract is concluded again after an end of a contract. FIG. 10 is a flowchart for describing the processing when a contract is concluded again after an end of a contract in the environment shown in FIG. 4.

Note that the following processing may be applied to when concluding a new trial contract or actual contract, in addition to the case of concluding an actual contract after an end of a trial contract and the case of concluding an actual contract again after an end of the actual contract.

Initially, the license management unit 11b of the license management server 10 determines whether a license is granted to a certain group (step S20).

If a license is granted (Y in step S20), the license management unit 11b notifies the maintenance server 20 of the grant of the license to the specific group via the communication unit 15 (step S21).

Next, the maintenance unit 21a of the maintenance server 20 receives the notification of the grant of the license to the specific group via the communication unit 25 (step S22).

Next, the maintenance unit 21a obtains an identification or identifications (ID(s)) for identifying the image forming apparatus(es) 40 belonging to the group to which the license is granted from the image forming apparatus(es) 40 (step S23).

Next, the history management unit 21b obtains history information linked with the ID(s) from the history DB 27a by using the obtained ID(s). The history management unit 21b passes the history information to the maintenance unit 21a (step S24).

Next, the maintenance unit 21a starts maintenance and the like of the corresponding image forming apparatus(es) 40 by using the history information (step S25).

That is the flow of processing when a contract is concluded again after an end of a contract.

<Processing Flow 3 (Without Re-Contract)>

Figure 11:
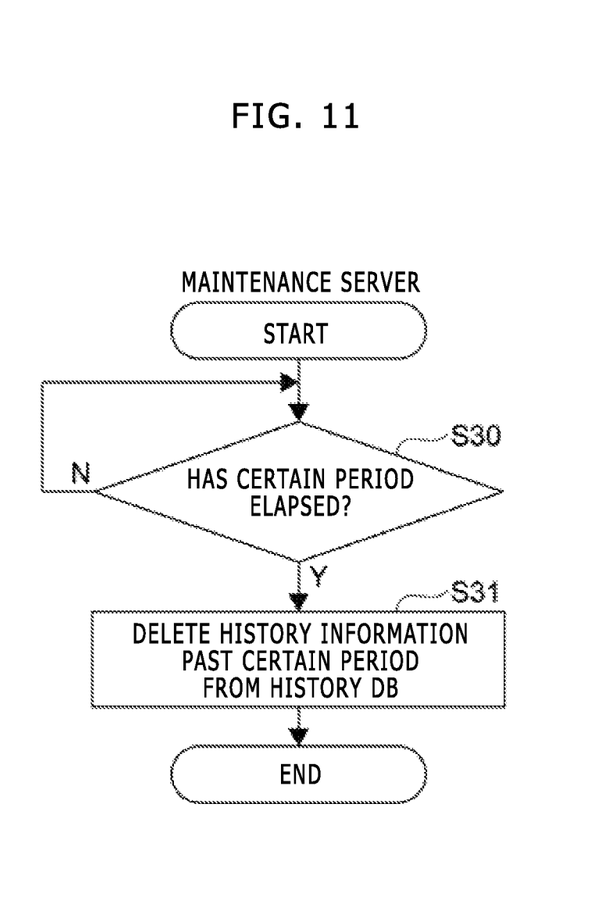
FIG. 11 is a flowchart showing processing when a contract is not concluded again within a certain period after an end of a contract in the environment shown FIG. 4.

Next, a flow of processing when a contract is not concluded again within a certain period after an end of a contract will be described. FIG. 11 is a flowchart for describing the processing when a contract is not concluded again within a certain period after an end of a contract in the environment shown in FIG. 4.

Initially, the history management unit 21b of the maintenance server 20 determines whether a certain time has elapsed since history information about an image forming apparatus or apparatuses 40 corresponding to a specific group is stored into the history DB 27a, on the basis of date and time information obtained from the clocking unit 29 (step S30).

Such determination processing may be performed, for example, once a day at a fixed time.

As employed herein, the certain time refers to a period such as half a year and one year. The period may be determined in advance. The administrator or a user of the maintenance server 20 may arbitrarily determine the period.

If the certain time has elapsed (Y in step S30), the history management unit 21b deletes the history information about the image forming apparatus(es) 40 corresponding to the specific group, stored in the history DB 27a (step S31).

In the foregoing description, the history information past the certain period is automatically deleted. However, this is not restrictive. The administrator or a user of the maintenance server 20 may be allowed to manually delete the history information.

That is the flow of processing when a contract is not concluded again within a certain period after an end of a contract.

As described above, according to the foregoing embodiment, history information about an image forming apparatus or apparatuses, obtained during a trial operation, can be used even after a start of official operations of remote maintenance of the image forming apparatuses(es).

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A system comprising:
   one or more image forming apparatuses installed in a customer's site,
   a license management server that manages a license for remote maintenance of the image forming apparatuses; the license management server providing the license for a group based on a group type, the group being an independent business organization to conclude a contract;
   a maintenance server that performs remote maintenance for an image forming apparatus; the maintenance server comprising:
     a storage unit;
     a maintenance unit that performs the remote maintenance for the one or more image forming apparatuses installed in the customer's site based on the license,
     a history management unit that stores maintenance information obtained from the one or more image forming apparatuses as history information in the storage unit,
     a clocking unit that clocks to determine whether a preset time has elapsed;
   wherein the license management server (i) determines whether an expiration date of the license provided for the group has expired, and (ii) notifies, if the expiration date has expired, the maintenance server of an expiration of the license for the group;
   the history management unit (iii) stores the history information about the one or more image forming apparatuses in the group with the expired license, and (iv) stops performing the remote maintenance for the one or more image forming apparatuses in the group with the notified expired license;
   the license management server (v) determines whether the license is provided for the group by a re-contract, and (vi) notifies, if the license is provided for the group by the re-contract, the maintenance server of a provision of the license of the group;
   the history management unit (vii) obtains from the storage unit the history information about the one or more image forming apparatuses in the group with the notified re-contracted license and (viii) passes the obtained history information to the maintenance unit,
   the maintenance unit resumes performing the remote maintenance to the one or more image forming apparatuses based on the history information pursuant to the license provided by the re-contract
   the history management unit (ix) determines whether a specified time has elapsed since the history information about the one or more image forming apparatuses in the group notified the expiration of the license is stored into the storage unit based on an information obtained from the clocking unit, and (x) deletes the history information stored in the storage unit, if the specified time has elapsed.

2. A maintenance method comprising:
   determining whether an expiration date of a license for a remote maintenance provided for a group has expired;
   storing, if the expiration date has expired, a maintenance history information about one or more image forming apparatuses in the group, stopping a performance of the remote maintenance for the one or more image forming apparatuses in the group with the expired license;

determining whether the license is provided for the group by a re-contract;

obtaining, if the license is provided for the group by the re-contract, the stored maintenance history information about the one or more image forming apparatuses in the group;

resuming the performance of the remote maintenance for the one or more image forming apparatuses based on the license provided by the re-contract by using the obtained maintenance history information;

determining whether a specified time has elapsed since the maintenance history information about the one or more image forming apparatuses in the group is stored; and deleting the stored history information, if the specified time has elapsed.

3. A non-transitory computer-readable storage medium in which a maintenance program is stored, the maintenance program causing a computer to execute the procedures of:

determining whether an expiration date of a license for a remote maintenance provided for a group has expired;

storing, if the expiration date has expired, a maintenance history information about one or more image forming apparatuses in the group, stopping a performance of the remote maintenance for the one or more image forming apparatuses in the group with the expired license;

determining whether the license is provided for the group by a re-contract;

obtaining, if the license is provided for the group by the re-contract, the stored maintenance history information about the one or more image forming apparatuses in the group;

resuming the performance of the remote maintenance for the one or more image forming apparatuses based on the license provided by the re-contract by using the obtained maintenance history information;

determining whether a specified time has elapsed since the maintenance history information about the one or more image forming apparatuses in the group is stored; and deleting the stored history information, if the specified time has elapsed.

4. A system comprising:

one or more image forming apparatuses installed in a customer's site, a management server that (i) performs a remote maintenance for the image forming apparatuses, and (ii) manages a license of the remote maintenance for the image forming apparatuses; the management server comprising:

a storage unit;

a license management unit that provides the license for a group based on a group type, the group being an independent business organization to conclude a contract;

a maintenance unit that performs the remote maintenance for the one or more image forming apparatuses installed in the customer's site based on the license;

a history management unit that stores maintenance information obtained from the one or more image forming apparatuses as history information in the storage unit;

a clocking unit that clocks to determine whether a preset time has elapsed;

wherein the license management unit (i) determines whether an expiration date of the license provided for the group has expired, and (ii) notifies, if the expiration date has expired, the history management unit of an expiration of the license for the group;

the history management unit (iii) stores the history information about the one or more image forming apparatuses in the group of the notified expired license, and (iv) stops performing the remote maintenance for the one or more image forming apparatuses in the group of the notified expired license;

the license management unit further (v) determines whether the license is provided for the group by a re-contract, and (vi) notifies, if the license is provided for the group by the re-contract, the history management unit of a provision of the license of the group;

the history management unit (vii) obtains from the storage unit the history information about the one or more image forming apparatuses in the group of the notified re-contracted license, and (viii) passes the obtained history information to the maintenance unit;

the maintenance unit resumes performing the remote maintenance for the one or more image forming apparatuses pursuant to the license provided by the re-contract based on using the history information passed from the history management unit; and the history management unit (ix) determines whether a specified time has elapsed since the history information about the one or more image forming apparatuses in the group notified the expiration of the license is stored into the storage unit based on an information obtained from the clocking unit, and (x) deletes the history information stored in the storage unit, if the specified time has elapsed.

* * * * *